(12) United States Patent
Narimatsu et al.

(10) Patent No.: US 12,221,568 B2
(45) Date of Patent: Feb. 11, 2025

(54) ADHESIVE TAPE AND METHOD FOR PRODUCING SAME

(71) Applicant: SEKISUI CHEMICAL CO., LTD., Osaka (JP)

(72) Inventors: Kiyoshirou Narimatsu, Hasuda (JP); Junji Shibayama, Hasuda (JP); Akihiko Bandou, Saitama (JP); Youhei Takanohashi, Ibaraki (JP); Nobuto Kamiya, Hasuda (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 546 days.

(21) Appl. No.: 17/424,371

(22) PCT Filed: Jan. 21, 2020

(86) PCT No.: PCT/JP2020/001953
§ 371 (c)(1),
(2) Date: Jul. 20, 2021

(87) PCT Pub. No.: WO2020/153357
PCT Pub. Date: Jul. 30, 2020

(65) Prior Publication Data
US 2022/0112403 A1    Apr. 14, 2022

(30) Foreign Application Priority Data

Jan. 22, 2019  (JP) ................... 2019-008672

(51) Int. Cl.
*C09J 7/29* (2018.01)
*C09J 7/38* (2018.01)

(52) U.S. Cl.
CPC . *C09J 7/29* (2018.01); *C09J 7/38* (2018.01); *C09J 2301/122* (2020.08);
(Continued)

(58) Field of Classification Search
CPC . C08K 7/22; C09J 2301/122; C09J 2301/208; C09J 2301/412; C09J 2400/24;
(Continued)

(56) References Cited

U.S. PATENT DOCUMENTS

2008/0160293 A1    7/2008  Arimitsu et al.
2009/0181250 A1*   7/2009  Zmarsly ............... B29C 48/154
                                                       428/343
(Continued)

FOREIGN PATENT DOCUMENTS

CN       1930262 A     3/2007
CN     107109148 A     8/2017
(Continued)

OTHER PUBLICATIONS

Translation of JP 10140107, Atsuta et al., May 26, 1998. (Year: 1998).*
(Continued)

*Primary Examiner* — Hai Vo
(74) *Attorney, Agent, or Firm* — FOLEY & LARDNER LLP (57) ABSTRACT

A pressure-sensitive adhesive tape (10) has a base material (11), and a pressure-sensitive adhesive layer (20) provided on the surface (11A) of the base material (11) and containing cells (21) in the inside thereof, wherein the cells (21) include first cells (21A) contacting with the surface (11A) of the base material (11) and second cells (21B) disposed at positions away from the surface (11A) of the base material (11). Thereby, even when the cells (21) are made to be much contained in the pressure-sensitive adhesive layer (20) and the amount of a pressure-sensitive adhesive is made small, a high pressure-sensitive adhesive performance of the pressure-sensitive adhesive tape (10) is retained.

6 Claims, 3 Drawing Sheets

(52) U.S. Cl.
CPC .... *C09J 2301/208* (2020.08); *C09J 2301/412* (2020.08); *C09J 2400/24* (2013.01); *C09J 2400/283* (2013.01); *C09J 2423/046* (2013.01)

(58) Field of Classification Search
CPC .. C09J 2400/283; C09J 2423/046; C09J 7/29; C09J 7/38
See application file for complete search history.

(56) References Cited

U.S. PATENT DOCUMENTS

| | | | | |
|---|---|---|---|---|
| 2010/0224316 | A1* | 9/2010 | Soejima | H01G 4/308 |
| | | | | 428/343 |
| 2011/0067799 | A1* | 3/2011 | Mussig | C09J 7/38 |
| | | | | 156/324 |
| 2016/0263876 | A1* | 9/2016 | Huang | C09J 123/08 |

FOREIGN PATENT DOCUMENTS

| | | | |
|---|---|---|---|
| CN | 107709491 | A | 2/2018 |
| JP | 60-076584 | A | 5/1985 |
| JP | S60-203687 | A | 10/1985 |
| JP | S61-101578 | A | 5/1986 |
| JP | S62-263278 | A | 11/1987 |
| JP | H02-29705 | B2 | 7/1990 |
| JP | 02-240182 | A | 9/1990 |
| JP | 2709353 | B2 | 2/1998 |
| JP | 10140107 | A * | 5/1998 |
| JP | H10-140107 | A | 5/1998 |
| JP | 2000186258 | A * | 7/2000 |
| JP | 2000-238225 | A | 9/2000 |

OTHER PUBLICATIONS

Translation of JP 2000186258A, Atsuta et al., Jul. 4, 2000. (Year: 2000).*

International Searching Authority, "International Search Report," issued in connection with International Patent Application No. PCT/JP2020/001953, dated Apr. 7, 2020.

International Searching Authority, "Written Opinion," issued in connection with International Patent Application No. PCT/JP2020/001953, dated Apr. 7, 2020.

* cited by examiner

ADHESIVE TAPE AND METHOD FOR PRODUCING SAME

CROSS-REFERENCE TO RELATED APPLICATIONS

The present application claims priority under 37 U.S.C. § 371 to International Patent Application No. PCT/JP2020/001953, filed Jan. 21, 2020, which claims priority to and the benefit of Japanese Patent Application No. 2019-008672, filed on Jan. 22, 2019. The contents of these applications are hereby incorporated by reference in their entireties.

TECHNICAL FIELD

The present invention relates to a pressure-sensitive adhesive tape having cells in the inside of a pressure-sensitive adhesive layer, and a method for producing the same.

BACKGROUND ART

Pressure-sensitive adhesive tapes are used in various fields, and, for example, as tapes to be used for packaging and the like, kraft tapes having kraft paper as a base material are broadly used. Conventionally, in pressure-sensitive adhesive tapes such as kraft tapes, as means of securing the pressure-sensitive adhesive strength in a small amount of a pressure-sensitive adhesive, making cells to be contained in pressure-sensitive adhesive layers and increasing the thickness are carried out.

As a method of making cells to be contained in a pressure-sensitive adhesive layer, there is known, for example, as disclosed in PTL1, a technique in which a volatile substance is made to penetrate in a tape base material and gasify the volatile substance to thereby form fine closed cells in the pressure-sensitive adhesive layer. Further as disclosed in PTL2, there is also a known technique in which after a pressure-sensitive adhesive containing thermally expandable microcapsules is applied on a base material, the thermally expandable microcapsules are caused to expand by being heated to thereby form cells in the inside of a pressure-sensitive adhesive layer.

CITATION LIST

Patent Literature

PTL1: JP 2-29705 B
PTL2: JP 2709353 B

SUMMARY OF INVENTION

Technical Problem

In pressure-sensitive adhesive tapes, it is demanded to decrease the amount of pressure-sensitive adhesives; for example, in the technique of forming cells by a volatile substance as shown in PTL1, it is attempted to increase the amount of the volatile substance caused to penetrate in a tape base material to raise the expansion ratio. When the expansion ratio is attempted to be raised by the technique, however, cells become too large and cell breakage and the like occur, posing a problem of deterioration of the pressure-sensitive adhesive performance. Specifically, while the pressure-sensitive adhesive strength in the initial pasting time becomes high, the pressure-sensitive adhesive strength cannot be retained and the occurrence of deficiencies such as peeling-off and turning-up becomes easy after pasting.

In the technique using thermally expandable microcapsules, an increase in the amount of the thermally expandable microcapsules is attempted; however, when the amount of the thermally expandable microcapsules is simply increased, there arises such a problem that the pressure-sensitive adhesive strength and the initial pasting property to adherends are lowered.

Then, the present invention has an object to provide a pressure-sensitive adhesive tape retaining high pressure-sensitive adhesive performance even when an increased amount of cells are contained in a pressure-sensitive adhesive layer and the amount of a pressure-sensitive adhesive is decreased.

Solution to Problem

As a result of exhaustive studies, the present inventors have found that by making cells contacting with the surface of a base material and cells disposed at positions away from the surface of the base material to be concurrently present in a pressure-sensitive adhesive layer, the above problem can be solved, and this finding has led to the completion of the following invention. The present invention provides the following [1] to [11].

[1] A pressure-sensitive adhesive tape, comprising: a base material; and a pressure-sensitive adhesive layer provided on the surface of the base material and comprising cells in the inside thereof,
wherein the cells comprise first cells contacting with the surface of the base material and second cells disposed at positions away from the surface of the base material.

[2] The pressure-sensitive adhesive tape according to the above [1], wherein the second cell is a cell derived from a foamable particle.

[3] The pressure-sensitive adhesive tape according to the above [1] or [2], wherein the second cell is a cell formed inside a hollow particle.

[4] The pressure-sensitive adhesive tape according to any one of the above [1] to [3], wherein the expansion ratio of the pressure-sensitive adhesive layer as measured by a compression test is 1.8 times or more.

[5] The pressure-sensitive adhesive tape according to any one of the above [1] to [4], wherein the average cell diameter of the cells contained in the pressure-sensitive adhesive layer is 70 μm or smaller.

[6] The pressure-sensitive adhesive tape according to any one of the above [1] to [5], wherein the base material comprises a paper base material and a resin layer provided on one surface of the paper base material, and the pressure-sensitive adhesive layer is provided on the other surface of the paper base material.

[7] The pressure-sensitive adhesive tape according to the above [6], wherein the paper base material is kraft paper and the resin layer is a polyethylene-based resin layer.

[8] The pressure-sensitive adhesive tape according to any one of the above [1] to [7], wherein the surface roughness (Rz) of an outer surface of the pressure-sensitive adhesive layer is 40 μm or smaller.

[9] The pressure-sensitive adhesive tape according to any one of the above [1] to [8], wherein the pressure-sensitive adhesive layer comprises: a foamed pressure-sensitive adhesive layer comprising cells in the inside thereof; and a non-foamed pressure-sensitive adhesive layer comprising no cells in the inside thereof, on the opposite side of the foamed pressure-sensitive adhesive layer to the base material side.

[10] A method for producing a pressure-sensitive adhesive tape, comprising: coating or impregnating the surface of a base material with a liquid volatile component; laminating a pressure-sensitive adhesive composition comprising foamable particles on the surface of the base material to obtain a laminate; and heating the laminate to thereby form cells in the inside of a pressure-sensitive adhesive layer constituted of the pressure-sensitive adhesive composition, wherein the cells comprises: first cells formed from the liquid volatile component on the surface of the base material; and cells derived from the foamable particles formed at positions away from the surface of the base material.

[11] The method for producing a pressure-sensitive adhesive tape according to the above [10], wherein when the laminate is heated, the laminate is heated so that the temperature of the surface of the laminate on the pressure-sensitive adhesive composition side is made to be lower than the temperature of the surface of the laminate on the base material side, to cause at least the foamable particles on the base material side of the pressure-sensitive adhesive composition to be foamed.

Advantageous Effect of Invention

According to the present invention, there can be provided a pressure-sensitive adhesive tape retaining high pressure-sensitive adhesive performance even when cells are made to be much contained in a pressure-sensitive adhesive layer and the amount of a pressure-sensitive adhesive is made small.

DESCRIPTION OF EMBODIMENTS

Hereinafter, the pressure-sensitive adhesive tape according to the embodiments of the present invention will be described in detail by reference to the drawings. In the present embodiment, a pressure-sensitive adhesive tape 10, as shown in FIG. 1, has a base material 11, and a pressure-sensitive adhesive layer 20 provided on one surface 11A of the base material 11 and having cells 21 in the inside thereof.

[Pressure-Sensitive Adhesive Layer]

In the pressure-sensitive adhesive layer 20, the cells 21 have first cells 21A contacting with the surface 11A of the base material 11 and second cells 21B disposed at positions away from the surface 11A of the base material 11. Due to that the pressure-sensitive adhesive layer 20 thus has not only the second cells 21B but also the first cells 21A contacting with the surface 11A of the base material 11, the occupied volume of cells in the pressure-sensitive adhesive layer 20 can be increased without making many cells to be contained in the vicinity of the outer surface 20A of the pressure-sensitive adhesive layer 20 and nor increasing the cell diameter more than necessary. Further since the cell diameter of the first cells 21A and the like does not have to be increased more than necessary, occurrence of cell breakage of the cells 21 becomes difficult. Hence, there can be formed the pressure-sensitive adhesive layer 20 exhibiting good adhesive performance and simultaneously having a sufficient thickness in a small amount of a pressure-sensitive adhesive.

Figure 1:
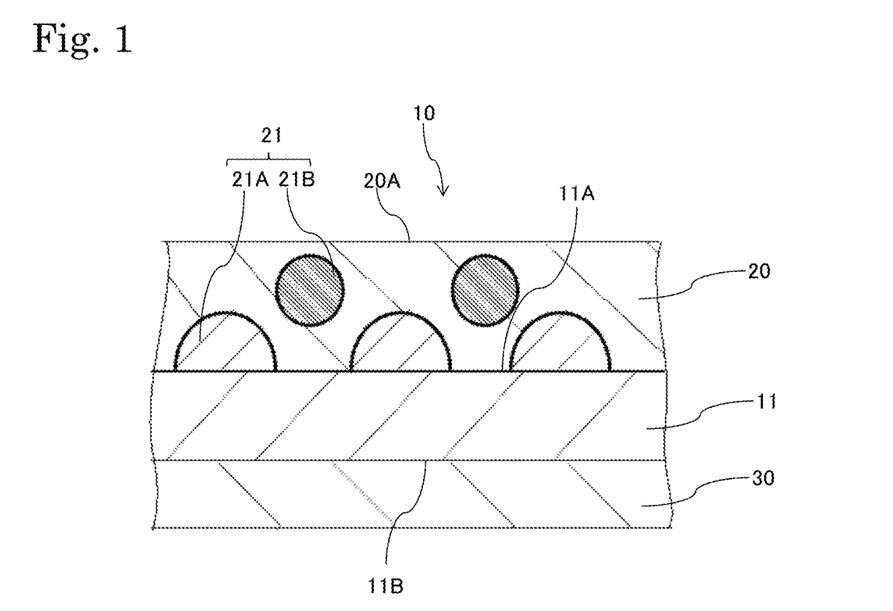
FIG. 1 is a schematic cross-sectional view illustrating a pressure-sensitive adhesive tape according to one embodiment of the present invention.

The first cells 21A, as shown in FIG. 1, has a shape expanding in the plane direction rather than in the thickness direction in the pressure-sensitive adhesive layer 20. It is favorable that the first cell 21A has such a shape that the side of the first cell 21A contacting with the surface 11A expands in the plane direction and the shape becomes smaller in the plane direction at positions becoming more distant from the surface 11A and typically becomes semispherical. The second cell 21B has such a shape that the central region of the second cell 21B in the thickness direction expands in the plane direction and the ends thereof on the outer surface 20A side and the surface 11A side become small in the plane direction, and typically becomes spherical. The first and second cells 21A, 21B are closed cells, which have no communication with each other.

In the present embodiment, as described in detail in a production method described later, it is favorable that the first cells 21A are formed by volatilizing a liquid volatile component. It is also favorable that the second cells 21B are cells derived from foamable particles. It is preferable that the foamable particles are, as described later, thermally expandable microcapsules. The thermally expandable microcapsules are already expanded in the pressure-sensitive adhesive tape 10, and become hollow particles each having a cell in the inside of an outer shell in the pressure-sensitive adhesive layer. That is, it is preferable that the second cells 21B are cells formed inside particles.

The average cell diameter (D) of cells 21 in the pressure-sensitive adhesive layer 20 is preferably 70 μm or smaller. By making the diameter to be 70 μm or smaller, cell breakage and the like due to the cells becoming too large can be prevented. Hence, the pressure-sensitive adhesive performance of the pressure-sensitive adhesive layer 20 is improved, and the pressure-sensitive adhesive strength after the initial pasting time can be prevented from becoming too high and the pressure-sensitive adhesive performance can be prevented from deteriorating after pasting. The average cell diameter (D) is preferably 60 μm or smaller and more preferably 50 μm or smaller.

Further the average cell diameter (D) of the cells 21 is not particularly limited, but is, from the viewpoint of making it easy for cells to be formed and making it easy for cells to reduce the amount of a pressure-sensitive adhesive, the average cell diameter is preferably 10 μm or larger, more preferably 20 μm or larger and still more preferably 25 μm or larger.

In the pressure-sensitive adhesive layer 20, it is preferable that the average cell diameter (D1) of the first cells 21A is larger than the average cell diameter (D2) of the second cells 21B. By such an aspect, since the cell diameters of cells present in the vicinity of the outer surface 20A of the pressure-sensitive adhesive layer 20 become small, it becomes easy for the pressure-sensitive adhesive performance of the pressure-sensitive adhesive layer 20 to be made good.

The specific average cell diameter (D1) of the first cells 21A is preferably 20 μm or larger and 100 μm or smaller, more preferably 30 μm or larger and 80 μm or smaller and still more preferably 35 μm or larger and 60 μm or smaller.

Then, it is preferable that the average cell diameter (D2) of the second cells 21B is smaller than the thickness of the pressure-sensitive adhesive layer 20. The specific average cell diameter (D2) is preferably 1 μm or larger and 50 μm or smaller, more preferably 5 μm or larger and 40 μm or smaller and still more preferably 10 μm or larger and 35 μm or smaller.

Here, the average cell diameter of the respective cells can be measured by observing the pressure-sensitive adhesive layer 20 from the outer surface 20A side in a plane view.

It is preferable that the expansion ratio (E) of the pressure-sensitive adhesive layer 20 is 1.8 times or more. By making the expansion ratio (E) to be 1.8 times or more, the thickness of the pressure-sensitive adhesive layer 20 can be sufficiently increased by the cells 21 and the amount of a pressure-sensitive adhesive in the pressure-sensitive adhesive layer 20 can be reduced with the pressure-sensitive adhesive performance being retained. From these viewpoints, the expansion ratio (E) of the pressure-sensitive adhesive layer 20 is more preferably 1.9 times or more and still more preferably 2.0 times or more.

Although a higher expansion ratio (E) is more favorable from the viewpoint of reduction of the amount of a pressure-sensitive adhesive, the expansion ratio (E) is preferably 3.2 times or less, more preferably 3.0 times or less, still more preferably 2.8 times or less and especially preferably 2.4 times or less from the viewpoint of the pressure-sensitive adhesive performance.

Here, the expansion ratio (E) is an index to represent the amount of the thickness increased by the cells 21 of the pressure-sensitive adhesive layer 20. The expansion ratio (E) can specifically be calculated from the thicknesses of the pressure-sensitive adhesive layer after being foamed/the pressure-sensitive adhesive layer unfoamed by determining, by a compression test shown in Examples described later, the amount of the thickness increased by the cells 21 of the pressure-sensitive adhesive layer 20, and determining the thicknesses of the pressure-sensitive adhesive layer unfoamed and the pressure-sensitive adhesive layer after being foamed, based on the amount of the thickness increased and the like.

The expansion ratio by the first cells 21A (E1) of the pressure-sensitive adhesive layer 20 is preferably 1.1 time or more and 1.9 times or less and more preferably 1.3 times or more and 1.8 times or less. Here, the expansion ratio by the first cells 21A is an expansion ratio when it is assumed that no second cells 21B are present, and can be measured, for example, by a method described in Examples described later.

Then, in the pressure-sensitive adhesive layer 20, the amount of the expansion ratio increased by the second cells 21B (E2) is preferably 0.05 time or more and 1.5 times or less and more preferably 0.1 time or more and 1.3 times or less.

Then, the amount of the expansion ratio increased (E2) can be calculated by subtracting the above expansion ratio by the first cells 21A (E1) from the expansion ratio of the whole pressure-sensitive adhesive layer 20(E).

The thickness of the pressure-sensitive adhesive layer 20 is not particularly limited, but is, from the viewpoint of suitably forming the cells 21 in the inside of the pressure-sensitive adhesive layer 20 and simultaneously securing the pressure-sensitive adhesive performance, preferably 10 μm or larger, more preferably 15 μm or larger and still more preferably 20 μm or larger. Further, the thickness of the pressure-sensitive adhesive layer 20 is preferably 150 μm or smaller, more preferably 100 μm or smaller and still more preferably 50 μm or smaller. By making the thickness to be these upper limit values or less, the amount of a pressure-sensitive adhesive can be reduced. Further, it becomes easy for the effect of providing the first cells 21A contacting with the surface 11A of the base material 11 to be exhibited.

The ball tack value measured for the outer surface 20A of the pressure-sensitive adhesive tape 20 is preferably 5 or higher and 14 or lower. When the ball tack value is in the above range, the initial pasting property of the pressure-sensitive adhesive layer 20 becomes proper and the pressure-sensitive adhesive tape becomes enabled to be suitably used as pressure-sensitive adhesive tapes for packing. From these viewpoints, the ball tack value of the pressure-sensitive adhesive layer 20 is more preferably 6 or higher and 12 or lower. Here, the ball tack value can be measured according to JIS Z0237:2009.

A pressure-sensitive adhesive constituting the pressure-sensitive adhesive layer 20 includes acrylic pressure-sensitive adhesives, rubber-based pressure-sensitive adhesives, urethane-based pressure-sensitive adhesives, polyvinyl ether-based pressure-sensitive adhesives and silicone-based pressure-sensitive adhesives. These pressure-sensitive adhesives each contain a resin component that is a base resin of the pressure-sensitive adhesives, such as an acryl resin, a rubber component, a urethane resin, a polyvinyl ether resin or a silicone resin, and is constituted by suitably blending the base resin further with additives and the like.

(Foamable Particle)

The pressure-sensitive adhesive layer 20, as described above, has cells derived from foamable particles. Therefore, the pressure-sensitive adhesive layer 20, as described later, can be formed by heating and foaming a pressure-sensitive adhesive composition containing, in addition to the base resin, foamable particles. The foamable particle is foamed by being heated, and may be a thermally decomposable foaming agent, but thermally expandable microcapsules are preferable. The thermally expandable microcapsule, by being heated, becomes a hollow particle having a cell in the inside of its outer shell. When the thermally expandable microcapsules are used in the present embodiment, gas generated from the foamable particles is prevented from escaping outside the pressure-sensitive adhesive layer 20, making it easy for proper amounts of the first and second cells 21A, 21B to be concurrently present in the pressure-sensitive adhesive layer 20 and making it easy for the expansion ratio to be improved.

The thermally expandable microcapsule includes a volatile substance such as a low-boiling point solvent in the inside of an outer shell resin; and the outer shell resin is softened by being heated, and since the included volatile substance is volatilized or expanded, the pressure expands the outer shell, making the particle diameter large.

It is preferable that the outer shell of the thermally expandable microcapsule is formed from a thermoplastic resin. As the thermoplastic resin, there can be used one or two or more selected from the group consisting of vinyl polymers of ethylene, styrene, vinyl acetate, vinyl chloride, vinylidene chloride, acrylonitrile, butadiene, chloroprene or the like, and copolymers thereof, polyamide such as nylon 6 and nylon 66, and polyesters such as polyethylene terephthalate. Among these, copolymers of acrylonitrile are preferable in that the included volatile substance hardly penetrates therethrough.

As the volatile substance included in the inside of the thermally expandable microcapsule, there is used one or two or more low-boiling point liquid selected from the group consisting of hydrocarbons having 3 to 7 carbon atoms, such as propane, propylene, butene, normal butane, isobutane, isopentane, neopentane, normal pentane, hexane and heptane, petroleum ether, methane halides such as methyl chloride and methylene chloride, chlorofluorocarbons such as $CCl_3F$ and $CCl_2F_2$, and tetraalkylsilanes such as tetramethylsilane and trimethylethylsilane. Among these, it is preferable to use hydrocarbons having 3 to 7 carbon atoms.

The thermally expandable microcapsule is not particularly limited, but there may be used one having, for example, an average particle diameter of 1 to 40 μm, and an expansion initiation temperature (referred to also as "foaming initiation temperature") of about 95 to 150° C. Here, the average particle diameter may be determined from a 10-point average obtained by randomly selecting 10 particles with an optical microscope or the like. Then the expansion initiation temperature is a temperature at which the expansion of the thermally expandable microcapsules is initiated, and can be measured by a thermomechanical analyzer (TMA) or the like.

Examples of commercially available products of the thermally expandable microcapsules include "EXPANCEL", manufactured by Akzo Nobel N.V., "Advancell", manufactured by Sekisui Chemical Co., Ltd., "Matsumoto Microsphere", manufactured by Matsumoto Yushi-Seiyaku Co., Ltd., and "Microsphere", manufactured by Kureha Corp.

The thermally decomposable foaming agent to be used as the foamable particle may be either of an organic foaming agent and an inorganic foaming agent. The organic foaming agent includes azo compounds such as azodicarbonamide, azodicarboxylic acid metal salts (barium azodicarboxylate and the like) and azobisisobutyronitrile, nitroso compounds such as a N,N'-dinitrosopentamethylenetetramine, hydrazine derivatives such as hydrazodicarbonimide, 4,4'-oxybis(benzenesulfonyl hydrazide) and tosyl hydrazide, and semicarbazide compounds such as tosyl semicarbazide.

The inorganic foaming agent includes ammonium carbonate, sodium carbonate, ammonium hydrogencarbonate, sodium hydrogencarbonate, ammonium nitrite, sodium borohydride and anhydrous monosoda citrate.

(Rubber-Based Pressure-Sensitive Adhesive)

As the pressure-sensitive adhesive constituting the pressure-sensitive adhesive layer 20, among the above, it is preferable to use a rubber-based pressure-sensitive adhesive. By using the rubber-based pressure-sensitive adhesive, the pressure-sensitive adhesive layer 20 is imparted with a certain or higher hardness, and it becomes easy to retain a certain shape even when many cells are formed in the inside. Hence, the pressure-sensitive adhesive layer 20 becomes easy to retain the pressure-sensitive adhesive performance even when the expansion ratio is raised. The rubber-based pressure-sensitive adhesive uses, as its base resin, a rubber component as described above; and the rubber component includes natural rubber, ethylene-propylene rubber (EPDM), chloroprene rubber (CR), isoprene rubber, butyl rubber (IIR), butadiene rubber (BR) and chlorosulfonated polyethylene. Among these, natural rubber is preferable. The rubber component may also be a thermoplastic elastomer.

The rubber component is preferably a thermoplastic elastomer. Particularly a styrenic thermoplastic elastomer is preferable. By using the thermoplastic elastomer, a pressure-sensitive adhesive can be made into a hot melt pressure-sensitive adhesive, and it becomes easy for fine cells to be suitably formed as described later.

As the styrenic thermoplastic elastomer, one obtained by block copolymerization of styrene and isoprene is preferably used; and the styrenic thermoplastic elastomer specifically includes styrene-isoprene-styrene block copolymers (SIS) and styrene-isoprene block copolymers (SI), and among these, SIS is more preferable.

It is preferable that the rubber-based pressure-sensitive adhesive contains, in addition to the above rubber component, a tackifier. The tackifier imparts the rubber-based pressure-sensitive adhesive with tackiness to improve the pressure-sensitive adhesive performance of the pressure-sensitive adhesive layer 20. The tackifier includes rosin-based resins, terpene-based resins, cumarone-indene resins, petroleum resins and terpene-phenol resins, and among these, petroleum resins are preferable. The content of the tackifier in the pressure-sensitive adhesive is, for example, 20 parts by mass or higher and 200 parts by mass or lower and preferably 50 parts by mass or higher and 150 parts by mass or lower, with respect to 100 parts by mass of the rubber component.

The rubber-based pressure-sensitive adhesive may contain, in addition to the above tackifier, a softener. By making the rubber-based pressure-sensitive adhesive to contain the softener, the pressure-sensitive adhesive is softened, making it easy for the applicability, the pressure-sensitive adhesive performance and the like to become good. The softener includes mineral oils (also called process oils) such as paraffin oils and naphthene oils, liquid polybutenes, liquid lanolines, liquid polyisoprenes and liquid polyacrylates. The content of the softener in the pressure-sensitive adhesive is, for example, 5 parts by mass or higher and 80 parts by mass or lower and preferably 10 parts by mass or higher and 50 parts by mass or lower, with respect to 100 parts by mass of the rubber component.

The pressure-sensitive adhesive constituting the pressure-sensitive adhesive layer 20 may suitably be blended with, other than the above, well-known additives used for pressure-sensitive adhesives, such as fillers, antioxidants, anti-aging agents, ultraviolet preventives and pigments.

[Base Material]

The base material 11 to be used for the pressure-sensitive adhesive tape may be a paper base material, a fabric base material or a resin film, or may be a multilayer base material obtained by combining these two or more. The base material may also be, for example, a multilayer base material in which a resin layer is provided on at least one surface of a paper base material or a fabric base material.

The paper base material includes kraft paper, glassine paper and woodfree paper. The fabric base material includes woven fabrics, knitted fabrics and nonwoven fabrics constituted of thermoplastic resins such as polyester-based resins, polyamide-based resins and polyolefin-based resins, natural fibers such as cotton yarns and hemp yarns and the like. The resin film includes polyester films, polyolefin films, polystyrene films, acryl resin films, polyphenylene sulfide films and EVA films. The resin layer to be used for the multilayer base material similarly includes polyester resin layers, polyolefin resin layers, polystyrene resin layers, acryl resin layers, polyphenylene sulfide resin layers and EVA resin layers.

Figure 2:
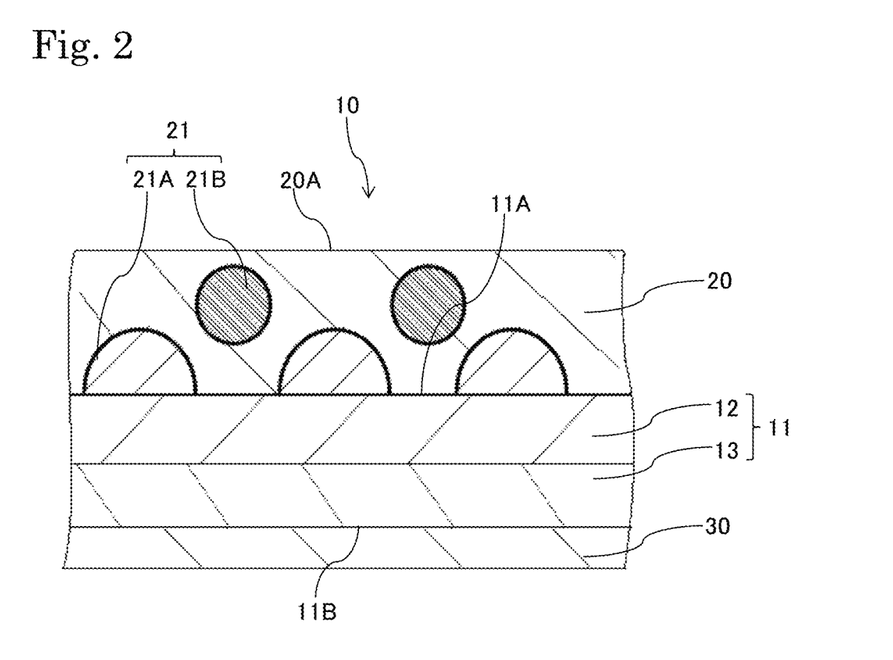
FIG. 2 is a schematic cross-sectional view illustrating a pressure-sensitive adhesive tape in which a base material is illustrated in detail, in one embodiment of the present invention.

Among these, the base material 11 is, as shown in FIG. 2, preferably a multilayer base material having a paper base material 12, and a resin layer 13 provided on one surface of the paper base material 12. In this case, it is favorable that the surface (the other surface) of the paper base material 12 on the opposite side to the one surface thereof on which the resin layer 13 is provided constitutes the surface 11A of the base material 11, and a pressure-sensitive adhesive layer 20 is provided on the other surface.

By using the paper base material 12 as shown in FIG. 2, it becomes easy for a liquid volatile component described later to be impregnated in the base material 11; and by providing the resin layer 13, it becomes difficult for the impregnated liquid volatile component to be volatilized from the back surface 11B of the base material 11. Hence, it becomes easy for first cells 21A to be efficiently formed in the pressure-sensitive adhesive layer 20.

The paper base material 12 is preferably a kraft paper, and the resin layer 13 is preferably a polyolefin resin layer. When a kraft paper is used as the paper base material 12, it becomes easy for the liquid volatile component to be more impregnated in the base material 11, and it becomes easy for the first cells 21A in a sufficient amount to be formed homogeneously. When a kraft paper is used, a pressure-sensitive adhesive tape 10 becomes a kraft tape and becomes suitable as a pressure-sensitive adhesive tape for packing or the like.

As a polyolefin resin to be used for the polyolefin resin layer, a polyethylene-based resin or a polypropylene-based resin is preferable, and a polyethylene-based resin is more preferable. That is, the resin layer 13 is preferably the polyethylene-based resin layer. By using the polyethylene-based resin, it becomes easy for the heat resistance and the adhesivity with a paper base material such as a kraft paper to become good, and further it also becomes easy to prevent the volatilization of the liquid volatile component from the back surface 11B.

The thickness of the base material 11 is not particularly limited, but is, for example, 10 μm or larger and 1,000 μm or smaller. Then when the base material 11 is a multilayer base material having the paper base material 12 and the resin layer 13 as described above, the basis weight of the paper base material 12 is preferably 10 g/m$^2$ or higher and 150 g/m$^2$ or smaller and more preferably 40 g/m$^2$ or higher and 100 g/m$^2$ or smaller. When the basis weight is made in the above range, it becomes easy to impregnate the liquid volatile component in the base material 11 without making the thickness of the base material 11 larger than necessary. Then the thickness of the resin layer 13 is, for example, preferably 5 μm or larger and 100 μm or smaller and more preferably 10 μm or larger and 50 μm or smaller.

[Release Agent Layer]

It is preferable that the pressure-sensitive adhesive tape 10, as shown in FIGS. 1 and 2, is provided with a release agent layer 30 on the surface (back surface 11B) of the base material 11 on the opposite side to the surface thereof on which the pressure-sensitive adhesive layer 20 is provided. Due to that the release agent layer 30 is provided, when the pressure-sensitive adhesive tape 10 is wound in a roll form to make a roll, the pressure-sensitive adhesive layer 20 results in contacting with the release agent layer 30. Hence, the pressure-sensitive adhesive tape 10 becomes enabled to be easily let out from the roll.

The release agent layer 30 may be formed from a well-known release agent such as a silicone-based release agent or a long-chain alkyl-based release agent. The thickness of the release agent layer 30 is not particularly limited, but the release agent layer 30 may be prepared so that the amount thereof coated becomes, for example, 0.1 g/m$^2$ or larger and 10 g/m$^2$ or smaller and preferably about 0.3 g/m$^2$ or larger and 5 g/m$^2$ or smaller.

It is favorable that the pressure-sensitive adhesive tape 10, as described above, is wound in a roll form to make a roll. It is favorable that the pressure-sensitive adhesive tape 10 is wound in a roll form, for example, centering a roll core. In the case of making a roll, the pressure-sensitive adhesive tape 10 may be wound so that the pressure-sensitive adhesive layer 20 faces inward and the release agent layer 30 faces outward; thereby, the outermost peripheral surface of the roll can be made to be the release agent layer 30. The pressure-sensitive adhesive tape 10, by being made into a roll, is suitable as a pressure-sensitive adhesive tape for packing or the like.

Of course, the pressure-sensitive adhesive tape 10 does not need to be made into a roll, and may be as it may be a sheet form. In such a case, a release sheet or the like to protect the pressure-sensitive adhesive layer 20 may be pasted on the surface of the pressure-sensitive adhesive layer 20; and it may be suitable to omit the release agent layer 30.

[Method for Producing the Pressure-Sensitive Adhesive Tape]

The pressure-sensitive adhesive tape 10 can be produced, though particularly limited to, by a production method comprising the following step 1 to step 3.

Step 1: a step of coating or impregnating the surface of a base material with a liquid volatile component Step 2: a step of laminating a pressure-sensitive adhesive composition comprising foamable particles on the surface of the base material Step 3: a step of heating a laminate obtained in step 2 to form cells in the inside of a pressure-sensitive adhesive layer constituted of the pressure-sensitive adhesive composition.

Hereinafter, the each step will be described in detail.

(Step 1)

The base material to be used in the present production method is as described above, but in the case of providing a release agent layer 30 in the pressure-sensitive adhesive tape 10, it is favorable that the release agent layer 30 is formed on the surface (back surface 11B) of the base material 11 on the opposite side to the surface (surface 11A) thereof on which the pressure-sensitive adhesive layer 20 is provided. It is favorable that the formation of the release agent layer is carried out, for example, by applying a release agent suitably diluted with a solvent or the like on the base material, and as required, carrying out heating, drying and the like thereon.

A liquid volatile component to be used in step 1 is a liquid at normal temperature (23° C.) at atmospheric pressure (1 atm), and a component to be volatilized by being heated is used. Examples of the liquid volatile component include water, alcohols such as ethanol, methanol, isopropanol and n-propanol, and organic solvents such as toluene, ethyl acetate and methyl ethyl ketone. Among these, water is suitably used because of being excellent in safety and not being volatilized drastically. These liquid volatile components may be used singly or concurrently in two or more.

A method of coating or impregnating the liquid volatile component is not particularly limited, but examples thereof include a method of transfer coating using a gravure roll or the like, and a method of spray coating using a spray coater or the like.

The amount of the liquid volatile component coated on the base material in the present production method is preferably 1 g/m² or larger and 10 g/m² or smaller. By making the amount of the liquid volatile component coated to be equal to or larger than the above lower limit value, a sufficient amount of the first cells 21A can be formed in the pressure-sensitive adhesive layer 20. Then by making that to be equal to or smaller than the above upper limit value, occurrence of cell breakage or the like due to the cell diameter of the first cells 21A becoming too large is prevented and it becomes easy to improve the pressure-sensitive adhesive performance. From these viewpoints, the amount of the liquid volatile component coated on the base material is more preferably 1.5 g/m² or larger and 8 g/m² or smaller and still more preferably 2 g/m² or larger and 5 g/m² or smaller.

(Step 2)

Step 2 is a step of laminating a pressure-sensitive adhesive composition comprising foamable particles on the surface of the base material coated or impregnated with the liquid volatile component in step 1.

Here, the pressure-sensitive adhesive composition comprises a base resin (resin component) constituting a pressure-sensitive adhesive, and a tackifier, a softener and additives blended as needed, and additionally foamable particles. The foamable particles are as described above, and preferably, thermally expandable microcapsules are used.

The amount of the foamable particles blended in the pressure-sensitive adhesive composition is preferably 0.05 part by mass or larger, more preferably 0.15 part by mass or larger and still more preferably 0.4 part by mass or larger, with respect to 100 parts by mass of the resin component (for example, a rubber component in the case of a rubber-based pressure-sensitive adhesive) that becomes a base resin. By making the amount of the foamable particles blended to be equal to or larger than these lower limit values, in the pressure-sensitive adhesive layer 20, a suitable amount of second cells 21B can be formed. The amount of the foamable particles blended is preferably 5 parts by mass or smaller, more preferably 3 parts by mass or smaller and still more preferably 2 parts by mass or smaller. By making the amount of the foamable particles blended to be equal to or smaller than these upper limit values, the amount of cells in the vicinity of the outer surface 20A of the pressure-sensitive adhesive layer 20 is suppressed and reduction of the pressure-sensitive adhesive performance by the cells 21 is prevented.

The pressure-sensitive adhesive composition may be of a solvent-diluted type, which has been diluted with a solvent, or a hot melt type, which has not been diluted with a solvent; and the hot melt type is preferable. By making the pressure-sensitive adhesive composition to be of the hot melt type, the pressure-sensitive adhesive composition is more easily softened by heat and the liquid volatile component is not prevented from being gasified, and the pressure-sensitive adhesive composition is more easily solidified by cooling and produced cells can be held in a finely dispersed state.

A method for preparing the pressure-sensitive adhesive composition is not particularly limited, and it is favorable to prepare it, for example, by mixing components constituting the pressure-sensitive adhesive composition by a stirrer or the like. Further in the case of the hot melt type, it is favorable to prepare it by heating and mixing the components at a temperature equal to or higher than the melting point of a resin component being a base resin. Then, in order to prevent the foamable particles from being expanded by the heating, the mixing may be carried out suitably under pressure.

A method of laminating the pressure-sensitive adhesive composition is not particularly limited, and examples thereof include a method of coating the pressure-sensitive adhesive composition directly on the base material by using a roll coater, a die coater, a hot melt coater or the like.

(Step 3)

Step 3 is a step of heating a laminate obtained by step 2 to thereby form cells 21 in the inside of the pressure-sensitive adhesive layer 20 constituted of the pressure-sensitive adhesive composition. In step 3, by volatilizing the liquid volatile component coated or impregnated on the base material, first cells 21A are caused to be formed at positions contacting with the surface 11A of the base material 11. By foaming the foamable particles contained in the pressure-sensitive adhesive composition, second cells 21B derived from the foamable particles are caused to be formed at positions away from the surface 11A of the base material 11.

The heating temperature in step 3 may be a temperature equal to or higher than the boiling point of the liquid volatile component and equal to or higher than the foaming initiation temperature of the foamable particles. The specific heating temperature is preferably 110° C. or higher and 220° C. or lower, more preferably 130° C. or higher and 210° C. or lower and still more preferably 150° C. or higher and 200° C. or lower.

The heating time in the above heating temperature is not limited as long as being a time in which the liquid volatile component is volatilized and the foamable particles are sufficiently foamed, but is preferably 1 s or longer and 120 s or shorter and more preferably 3 s or longer and 60 s or shorter.

A heating method is not particularly limited, but for example, the laminate may be passed through a heating oven whose inside is heated at a predetermined temperature.

As described above, the pressure-sensitive adhesive tape of the present invention has been described in detail by reference to the embodiments, but the pressure-sensitive adhesive tape is not limited to the above constitutions as long as having the advantageous effect of the present invention. For example, the first cells 21A may be formed from other than the liquid volatile component, and the second cells 21B may be formed from other than the foamable particles. Further, the first and second cells do not need to be closed cells. Further, the release agent layer may suitably be omitted and a different layer in place of the release agent layer may also be provided on the back surface 11B of the base material 11. Alternatively, another layer may be provided between the release agent layer and the back surface 11B of the base material 11.

The pressure-sensitive adhesive tape according to the embodiments of the present invention can be modified as follows.

In the above pressure-sensitive adhesive tape according to the embodiments of the present invention, the surface roughness of the outer surface 20A of the pressure-sensitive adhesive layer 20 is not particularly limited. However, the surface roughness (Rz) of the outer surface 20A of the pressure-sensitive adhesive layer 20 may be 40 μm or smaller. When the surface roughness (Rz) of the outer surface 20A of the pressure-sensitive adhesive layer 20 is 40 μm or smaller, even when cells are made to be much contained in the pressure-sensitive adhesive layer and the amount of the pressure-sensitive adhesive is made small, a high pressure-sensitive adhesive performance is retained and the long-term stability of the pressure-sensitive adhesive performance is improved.

The following reason does not limit the present invention, but when the surface roughness (Rz) of the outer surface 20A of the pressure-sensitive adhesive layer 20 is 40 μm or smaller, it is conceivably due to the following reason that the long-term stability of the pressure-sensitive adhesive performance in the pressure-sensitive adhesive tape 10 is improved.

When the surface roughness (Rz) of the outer surface 20A of the pressure-sensitive adhesive layer 20 is 40 μm or smaller, it is conceivable that cells are not present in the vicinity of the outer surface 20A of the pressure-sensitive adhesive layer 20, or even when cells are present in the vicinity of the outer surface 20A of the pressure-sensitive adhesive layer 20, the cell diameter of the cells is small. When cells are not present in the vicinity of the outer surface 20A of the pressure-sensitive adhesive layer 20, occurrence of the cell breakage of the cells in the pressure-sensitive adhesive layer 20 becomes difficult. It also becomes difficult for the cell breakage of the cells small in diameter to occur. Hence, it is conceivable that when the surface roughness (Rz) of the outer surface 20A of the pressure-sensitive adhesive layer 20 is 40 μm or smaller, even when the pressure-sensitive adhesive tape is stored in a long term, since the cell breakage of the cells 21 in the pressure-sensitive adhesive layer 20 does not occur, the long-term stability of the pressure-sensitive adhesive tape 10 is improved.

From the viewpoint of the long-term stability of the pressure-sensitive adhesive performance of the pressure-sensitive adhesive tape 10, the surface roughness (Rz) of the outer surface 20A of the pressure-sensitive adhesive layer 20 is preferably 30 μm or smaller, more preferably 25 μm or smaller and still more preferably 20 μm or smaller. The lower limit value in the range of the surface roughness (Rz) of the outer surface 20A of the pressure-sensitive adhesive layer 20 is not particularly limited, but is, for example, 0 μm or larger. Here, the surface roughness (Rz) of the outer surface 20A of the pressure-sensitive adhesive layer 20 means a value measured based on a method described in Examples described later.

Figure 3:
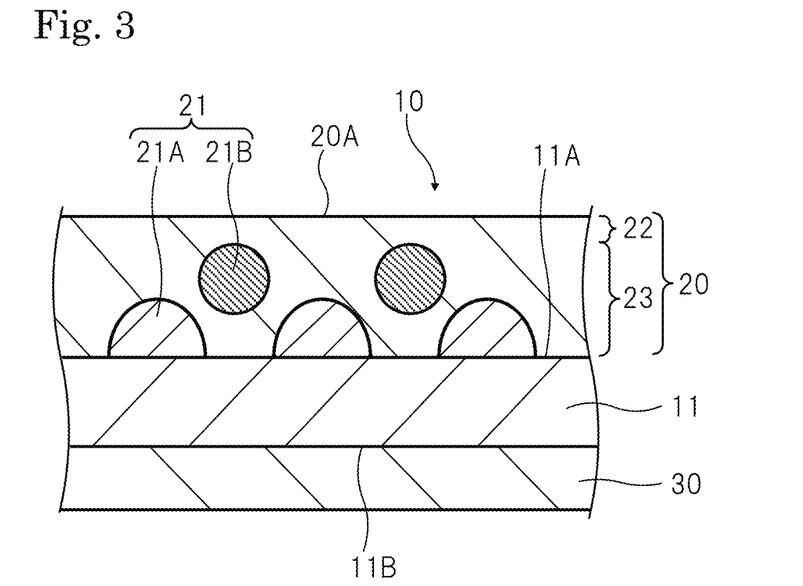
FIG. 3 is a schematic cross-sectional view of a pressure-sensitive adhesive tape according to a modified example of one embodiment of the present invention.

The pressure-sensitive adhesive tape 10 having a surface roughness (Rz) of the outer surface 20A of a pressure-sensitive adhesive layer 20 of 40 μm or smaller includes, for example, a pressure-sensitive adhesive tape 10 shown in FIG. 3. A pressure-sensitive adhesive layer 20 of this pressure-sensitive adhesive tape 10 comprises a foaming pressure-sensitive adhesive layer 23 containing cells in the inside thereof and a non-foaming pressure-sensitive adhesive layer 22 containing no cells in the inside thereof, on the opposite side of the foamed pressure-sensitive adhesive layer to the base material side. Thereby, cells can be made not to be present in the vicinity of the outer surface of the pressure-sensitive adhesive layer 20, thereby preventing generation of protrusions on the outer surface of the pressure-sensitive adhesive layer by cells present in the vicinity of the outer surface and making it easy for the surface roughness (Rz) of the outer surface 20A of the pressure-sensitive adhesive layer 20 to be made to be 40 μm or smaller. Here, since the foaming pressure-sensitive adhesive layer 23 and the non-foaming pressure-sensitive adhesive layer 22 usually have a difference only in presence/absence of cells, the interface between the foaming pressure-sensitive adhesive layer 23 and the non-foaming pressure-sensitive adhesive layer 22 is not clear.

The ball tack value measured for the outer surface 20A of the pressure-sensitive adhesive tape 20 stored in a thermostatic chamber set at 40° C. for 4 weeks is preferably 5 to 14. When the ball tack value is in the above range, the long-term stability of the pasting property of the pressure-sensitive adhesive layer 20 becomes excellent and the pressure-sensitive adhesive tape 10 is enabled to be suitably used as a pressure-sensitive adhesive tape for packing or the like. From these viewpoints, the ball tack value measured for the pressure-sensitive adhesive layer 20 of the pressure-sensitive adhesive tape 20 stored in a thermostatic chamber set at 40° C. for 4 weeks is more preferably 6 to 12. Here, the ball tack value can be measured according to JIS Z0237:2009.

The pressure-sensitive adhesive tape 10 having a surface roughness (Rz) of the outer surface 20A of the pressure-sensitive adhesive layer 20 of 40 μm or smaller can be produced, for example, as follows. In step 3 in the above production method of the pressure-sensitive adhesive tape, the laminate is heated so that the temperature of the surface of the laminate on the pressure-sensitive adhesive composition side is made to be lower than the temperature of the surface of the laminate on the base material side, to cause at least the foamable particles on the base material side of the pressure-sensitive adhesive composition to be foamed. Thereby, the foamable particles present on the base material side of the pressure-sensitive adhesive composition is caused to be foamed, and the foamable particles present in the vicinity of the surface of the pressure-sensitive adhesive composition on the opposite side to the base material side are not caused to be foamed, or even when the foamable particles are caused to be foamed, the cell diameter can be made small. Due to that the foamable particles present in the vicinity of the surface of the pressure-sensitive adhesive composition on the opposite side to the base material side are not caused to be foamed, generation of protrusions on the outer surface of the pressure-sensitive adhesive layer by cells present in the vicinity of the outer surface can be prevented and the surface roughness (Rz) of the outer surface 20A of the pressure-sensitive adhesive layer 20 can be made to be 40 μm or smaller. Further by making small the cell diameter of the foamable particles present in the vicinity of the surface of the pressure-sensitive adhesive composition on the opposite side to the base material side, even when protrusions on the outer surface of the pressure-sensitive adhesive layer are generated by cells present in the vicinity of the outer surface, the height of the protrusions can be made to be 40 μm or lower. The cell diameter of the cells present in the vicinity of the outer surface is, for example, 40 μm or smaller, preferably 30 μm or smaller, more preferably 25 μm or smaller and still more preferably 20 μm or smaller. Thereby, the surface roughness (Rz) of the outer surface 20A of the pressure-sensitive adhesive layer 20 becomes 40 μm or smaller.

The heating temperature of the base material side of the laminate in step 3 may be a temperature equal to or higher than the boiling point of the liquid volatile component and equal to or higher than the foaming initiation temperature of the foamable particles. The specific heating temperature is preferably 110° C. to 170° C. and more preferably 130 to 165° C. On the other hand, the heating temperature of the pressure-sensitive adhesive composition side of the laminate in step 3 may be a temperature lower, preferably by 20° C. or higher, more preferably 25° C. or higher and still more preferably 30° C. or higher, than the heating temperature of the base material side of the laminate. The specific heating temperature is preferably 85 to 145° C. and more preferably 105 to 140° C.

Then the heating time in the above heating temperature is not limited as long as being not shorter than a time in which the liquid volatile component is volatilized and the foamable particles present on the base material side of the pressure-sensitive adhesive composition are foamed, and not longer than a time in which the foamable particles present in the vicinity of the surface of the pressure-sensitive adhesive composition on the opposite side to the base material side are not foamed. For example, the heating time is preferably 1 to 20 s, more preferably 2 to 10 s and still more preferably 3 to 5 s.

A heating method is not particularly limited, but examples thereof include hot air, infrared rays and microwaves. For example, the laminate may be passed through a heating oven whose inside is heated at a predetermined temperature. A conveying method in the heating oven is not particularly limited, but examples thereof include a roll support system, an air floating system, a belt conveyance system and a hanging dryer system.

When the amount of the foamable particles blended in the pressure-sensitive adhesive composition is large, it becomes easy for cells to be generated in the vicinity of the outer surface of the pressure-sensitive adhesive layer 20 and it becomes easy for the surface roughness (Rz) of the outer surface 20A of the pressure-sensitive adhesive layer 20 to become larger than 40 μm. From such a viewpoint, the amount of the foamable particles blended in the pressure-sensitive adhesive composition is, with respect to 100 parts by mass of a resin component (for example, in the case of a rubber-based pressure-sensitive adhesive, a rubber component) to become a base resin, preferably 1.4 parts by mass or smaller and more preferably 1.0 part by mass or smaller.

Figure 4:
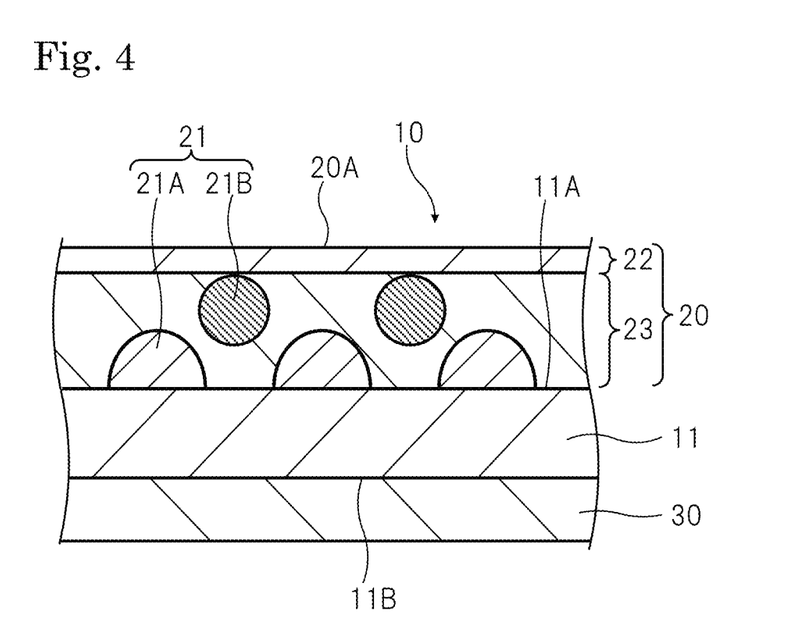
FIG. 4 is a schematic cross-sectional view of a pressure-sensitive adhesive tape according to a modified example of one embodiment of the present invention.

Then as in a pressure-sensitive adhesive tape 10 shown in FIG. 4, a pressure-sensitive adhesive layer 20 may be constituted so as to be formed by forming a non-foaming pressure-sensitive adhesive layer 22 containing no cells in the inside thereof on a foaming pressure-sensitive adhesive layer 23 containing cells in the inside thereof. Also in this case, since no cells causing the formation of protrusions on the outer surface 20A of the pressure-sensitive adhesive layer 20 is present in the non-foaming pressure-sensitive adhesive layer 22 present in the vicinity of the outer surface of the pressure-sensitive adhesive layer 20, it becomes easy for the surface roughness (Rz) of the outer surface 20A of the pressure-sensitive adhesive layer 20 to be easily made to be 40 μm or smaller. A pressure-sensitive adhesive tape may be produced, for example, by applying a pressure-sensitive adhesive composition containing foamable particles on a base material, and thereafter applying a pressure-sensitive adhesive composition containing no foamable particles on a layer of the pressure-sensitive adhesive composition containing foamable particles, and causing an obtained laminate to be foamed. Alternatively, a pressure-sensitive adhesive tape may be produced by applying a pressure-sensitive adhesive composition containing foamable particles on a base material, and causing an obtained laminate to be foamed, and thereafter further applying a pressure-sensitive adhesive composition containing no foamable particles on the laminate.

Figure 5:
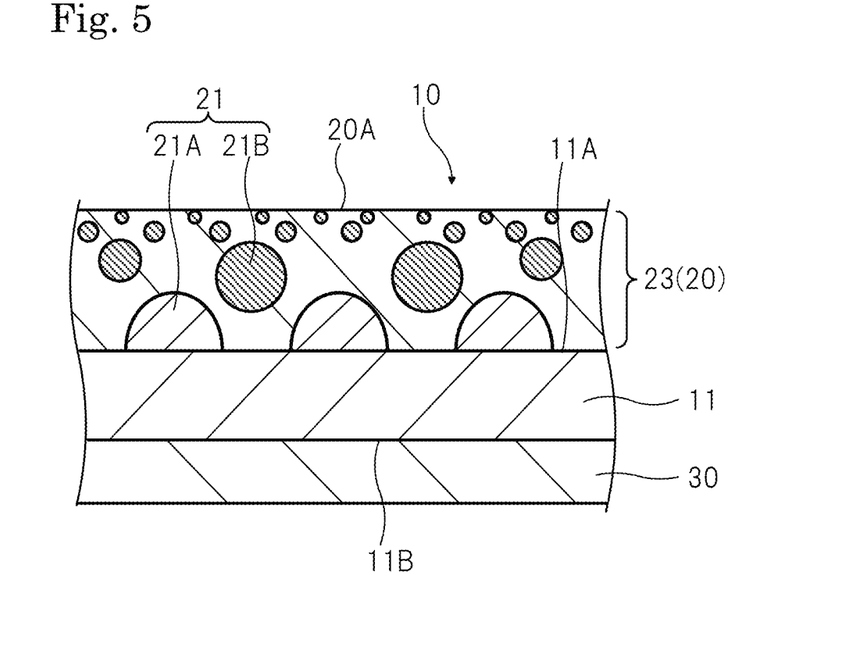
FIG. 5 is a schematic cross-sectional view of a pressure-sensitive adhesive tape according to a modified example of one embodiment of the present invention.

When the surface roughness (Rz) of the outer surface 20A of the pressure-sensitive adhesive layer 20 can be made to be 40 μm or smaller, the pressure-sensitive adhesive layer 20 does not need to contain a non-foaming pressure-sensitive adhesive layer containing no foamable particles in the inside thereof. For example, as in a pressure-sensitive adhesive tape 10 shown in FIG. 5, by making small the cell diameter of first cells 21A present in the vicinity of the outer surface of a pressure-sensitive adhesive layer 20, even when the first cells 21A are present in the vicinity of the outer surface of the pressure-sensitive adhesive layer 20, the surface roughness (Rz) of the outer surface 20A of the pressure-sensitive adhesive layer 20 can be made to be 40 μm or smaller. The cell diameter of the first cells 21A in the vicinity of the outer surface of the pressure-sensitive adhesive layer 20 is, for example, 40 μm or smaller, preferably 30 μm or smaller, more preferably 25 μm or smaller and still more preferably 20 μm or smaller.

EXAMPLES

Hereinafter, Examples of the present invention will be described. However, the present invention is not any more limited to the following Examples.

Measurement methods and evaluation methods were as follows.

<The Average Cell Diameter (D)>

For obtained pressure-sensitive adhesive tapes each, a region of 1 mm×1 mm from an outer surface side of their pressure-sensitive adhesive layer was observed in a magnification of 200 times by an optical microscope ("VHX-6000", manufactured by Keyence Corp.); and cell diameters of cells in the above region were measured, and their average value was taken as the average cell diameter (D). Further, by the same method, average cell diameters (D1), (D2) of first cells and second cells were measured.

<The Expansion Ratio (E)>

Figure 6:
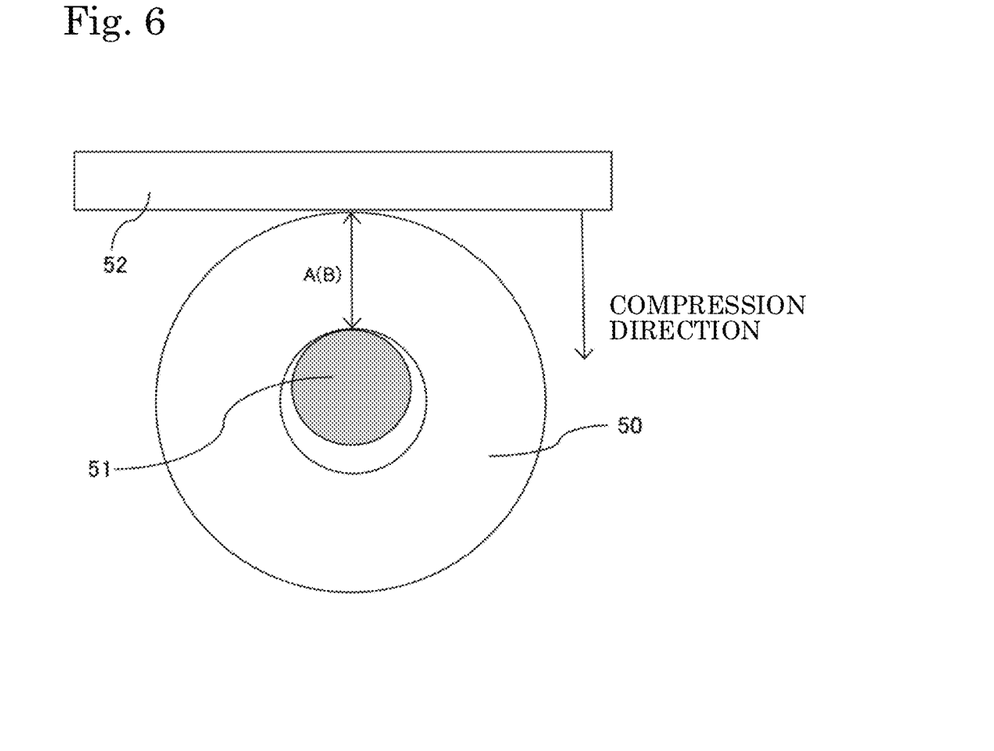
FIG. 6 is a schematic view illustrating a method of measuring the expansion ratio by a compression test.

Pressure-sensitive adhesive tapes were each wound in 50 m centering a cylindrical roll core (outer diameter: 80 mm) to make a roll. As shown in FIG. 6, a cylindrical fixed part 51 is passed through the inside of the roll core of the obtained roll 50, and a moving part 52 is pressed against the outer peripheral surface of the roll 50 and pressed toward the diameter inner side direction to compress the roll 50 along the diameter direction. The compression of the roll 50 used a Tensilon "RTC-1310A" (manufactured by Orientec Co., Ltd.).

In a graph (moving distance (x axis) vs. load (y axis)) when the roll was compressed, a tangent on a portion where the gradients of tangents assumed a constant value was extrapolated to the x axis, and a value of x at the intersection point with the x axis was calculated as a thickness (A) of the roll containing cells. Thereafter, the same operation was carried out on a tape sample having no cells; the thickness (B) of a roll containing no cells was measured from a calculated intersection point; by subtracting the thickness (B) from the thickness (A), a thickness increased by the cells contained in the roll was calculated; and by dividing the increased thickness by the number of laminations of the tape, the quotient was taken as an amount of thickness increased by the cells contained per one sheet of the tape. With regard to the expansion ratio (E), the thickness of the pressure-sensitive adhesive layer of the tape sample having no cells was taken as a thickness of the pressure-sensitive adhesive layer unfoamed; and the value obtained by adding the amount of the thickness increased to the thickness of the pressure-sensitive adhesive layer unfoamed was taken as a thickness of the pressure-sensitive adhesive layer after being foamed; and the expansion ratio (E) was calculated from the thickness of the pressure-sensitive adhesive layer after being foamed/the thickness of the pressure-sensitive adhesive layer unfoamed.

Here, the tape sample having no cells was a sample obtained when a pressure-sensitive adhesive tape was fabricated by the same method as in Examples and Comparative Examples, except for coating or impregnating no liquid volatile component on the base material and blending no foamable particles in the pressure-sensitive adhesive composition.

<The Expansion Ratio (E1) by the First Cells, and the Amount of the Expansion Ratio (E2) Increased by the Second Cells>

A pressure-sensitive adhesive tape was fabricated by the same method as in Examples and Comparative Examples, except for blending no foamable particles in the pressure-sensitive adhesive composition, and an obtained sample was taken as a tape sample having no foamable particles. The expansion ratio of the tape sample having no foamable particles was measured as in the above, and an obtained expansion ratio was taken as an expansion ratio (E1) by the first cells. Then by subtracting the expansion ratio (E1) by the first cells from the expansion ratio (E) calculated in the above, an amount of the expansion ratio increased by the second cells was calculated.

<The Surface Roughness (Rz)>

The surface roughness (Rz) was calculated, by using a roughness curve measured according to JIS B0601, from a difference between an average of highest five mountain heights in the order of decreasing height among from an average line to mountain tops, and an average of deepest five valley depths in the order of decreasing depth among from the average line to valley bottoms.

<The Ball Tack (Initial)>

The ball tack value of the pressure-sensitive adhesive layer was measured at an inclination angle of 30° according to JIS Z0237:2009. The ball tack (initial) was evaluated from a measured ball tack value based on the following evaluation criteria.

A: The ball tack value was 6 or higher and 12 or lower; the initial pasting property was excellent.

B: The ball tack value was lower than 6 or higher than 12, but 5 or higher and 14 or lower; the initial pasting property was good.

C: The ball tack value was lower than 5 or higher than 14; the pressure-sensitive adhesive strength became insufficient or the pressure-sensitive adhesive strength was too high and the reworkability became insufficient; the initial pasting property was insufficient.

<The Packing Performance (Initial)>

A commercially available corrugated box was prepared which had a size of 400 mm×320 m×300 mm, and a length of a flap abutting portion of 400 mm. A pressure-sensitive adhesive tape of 50 mm in width was pasted in I pasting and compression bonded at 100 g/50 mm at 25° C. on the flap abutting portion of the corrugated box. Thereafter, after the resultant was left at an atmospheric temperature of 25° C. at a humidity of 50% RH or lower for 24 hours, the peeling rate was measured and was evaluated based on the following evaluation criteria. The peeling rate is a proportion of the area of a peeled portion to the used pressure-sensitive adhesive tape.

AA: The peeling rate was 25% or lower; the excellent pressure-sensitive adhesive strength could be retained over a long period even after pasting.

A: The peeling rate was higher than 25% and 40% or lower; a certain pressure-sensitive adhesive strength could be retained over a long period even after pasting.

B: The peeling rate was higher than 40% and 50% or lower; the pressure-sensitive adhesive strength practically usable could be retained even after pasting.

C: The peeling rate was higher than 50%; a good pressure-sensitive adhesive strength could not be retained over a long period after pasting.

<The Ball Tack (Long-Term Stability)>

The ball tack (long-term stability) of a pressure-sensitive adhesive tape was evaluated as in the ball tack (initial), except for evaluating the pressure-sensitive adhesive tape stored in a thermostatic chamber set at 40° C. for 4 weeks in place of evaluation of the pressure-sensitive adhesive tape as it was fabricated.

<The Packing Performance (Long-Term Stability)>

A pressure-sensitive adhesive tape stored in a thermostatic chamber set at 40° C. for 4 weeks was evaluated in place of evaluation of the pressure-sensitive adhesive tape as it was fabricated. Then, the pressure at which the pressure-sensitive adhesive tape was compression bonded on a corrugated box was altered from 100 g/50 mm to 32 g/50 mm. Further, the time of being left at an atmospheric temperature of 25° C. at a humidity of 50% RH or lower was altered from 24 hours to 1 hour. Then, except for the above, the packing performance (long-term stability) of the pressure-sensitive adhesive tape was evaluated as in the packing performance (initial).

Example 1

A polyethylene (PE) was extrusion laminated on one surface of a paper base material composed of an unbleached kraft paper Clupak processed and wet-strength processed of 73 g/m$^2$ in basis weight so as to make a thickness of the PE of 20 μm to thereby form a polyethylene-based resin layer on the one surface of the paper base material to thereby obtain a base material composed of the paper base material and the resin layer. A silicone-based release agent was applied and dried on the polyethylene-based resin layer of the obtained base material so that the amount after drying of the silicone-based release agent coated became 1 g/m$^2$ to thereby form a release agent layer on the back surface of the base material.

Then, water as a liquid volatile component was spray coated on the surface of the base material so that the amount of the water coated became 4 g/m$^2$, and thereafter, thereon, a hot melt-type pressure-sensitive adhesive composition obtained by stirring a composition indicated in Table 1 at 150° C. at 1.0 MPa was applied at 150° C. so that the coating width became 300 mm and the amount coated became 16 g/m$^2$ to thereby obtain a laminate. The obtained laminate was heated at 160° C. for 30 s to cause steam foaming and particle foaming to thereby obtain a pressure-sensitive adhesive tape of Example 1.

In the pressure-sensitive adhesive tape, the average cell diameter of cells (first cells) obtained by the steam foaming was 50 μm; the average cell diameter of cells (second cells) obtained by the particle foaming was 21 μm; and the average cell diameter of cells as a whole contained in the pressure-sensitive adhesive layer was 43 μm.

TABLE 1

| | |
|---|---|
| Styrene-isoprene-styrene block copolymer (trade name "SIS5506", manufactured by JSR Corp.) | 100 parts by mass |
| Petroleum resin (trade name "Quintone A-100", manufactured by Zeon Corp.) | 110 parts by mass |
| Process oil (trade name "Crisef-oil F220", manufactured by JXTG Energy Corp.) | 30 parts by mass |
| Antiaging agent (trade name "Yoshinox 425", manufactured by Yoshitomi Pharmaceutical Industries, Ltd.) | 1 part by mass |
| Foamable particle (trade name "EXPANCEL 920DU20", manufactured by Akzo Nobel N.V.) | 0.28 part by mass |

Examples 2 to 8

The same procedure as in Example 1 was carried out, except for altering the number of parts blended of the foamable particles and the amount of the pressure-sensitive adhesive coated to those indicated in Table 2.

Examples 9 to 12

The same procedure as in Example 1 was carried out, except for altering the number of parts blended of the foamable particles, the heating condition of a laminate and the amount of the pressure-sensitive adhesive coated to those indicated in Table 3, and in Example 10, using, as the foamable particles, "Advancell EM304 (particle diameter before being foamed: 24 μm)", manufactured by Sekisui Chemical Co., Ltd.

Comparative Example 1

The same procedure as in Example 1 was carried out, except for making the pressure-sensitive adhesive composition to contain no foamable particles and altering the amount of water coated to that indicated in Table 2. In an obtained pressure-sensitive adhesive layer, only cells by water foaming were contained as cells.

Comparative Example 2

The same procedure as in Example 1 was carried out, except for coating no water on the surface of the base material, and altering the number of parts blended of the foamable particles contained in the pressure-sensitive adhesive composition to that indicated in Table 2. In an obtained pressure-sensitive adhesive layer, only cells derived from the foamable particles were contained as cells.

TABLE 2

| | Example | | | | | | | | Comparative Example | |
|---|---|---|---|---|---|---|---|---|---|---|
| | 1 | 2 | 3 | 4 | 5 | 6 | 7 | 8 | 1 | 2 |
| Amount of water coated (g/m$^2$) | 4 | 4 | 4 | 4 | 4 | 4 | 4 | 4 | 5.5 | 0 |
| Parts of foamable particles (parts by mass) | 0.28 | 0.46 | 0.60 | 0.92 | 1.38 | 1.80 | 2.30 | 2.30 | 0 | 1.67 |
| Amount of pressure-sensitive adhesive coated (g/m$^2$) | 16 | 15 | 14 | 13 | 12 | 11 | 10 | 9 | 16 | 16 |
| Average cell diameter (D) (μm) | 43 | 40 | 38 | 35 | 33 | 30 | 29 | 28 | 85 | 20 |
| Expansion ratio (E) | 1.90 | 2.00 | 2.10 | 2.30 | 2.50 | 2.80 | 3.00 | 3.20 | 1.90 | 1.90 |
| Expansion ratio by first cells (E1) | 1.75 | 1.75 | 1.75 | 1.75 | 1.75 | 1.75 | 1.75 | 1.75 | 1.90 | 1.00 |
| Amount of expansion ratio increased by second cells (E2) | 0.15 | 0.25 | 0.35 | 0.55 | 0.75 | 1.05 | 1.25 | 1.45 | 0 | 0.90 |
| Thickness of pressure-sensitive adhesive layer (μm) | 30 | 30 | 29 | 30 | 30 | 31 | 30 | 29 | 30 | 30 |
| Ball tack value (initial) | 12 | 12 | 11 | 10 | 8 | 7 | 6 | 5 | 15 | 4 |
| | A | A | A | A | A | A | A | B | C | C |
| Packing performance (initial) (peeling rate %) | 20 | 20 | 20 | 25 | 30 | 35 | 40 | 45 | 60 | 85 |
| | AA | AA | AA | AA | A | A | A | B | C | C |

TABLE 3

|  | Example | | | |
| --- | --- | --- | --- | --- |
|  | 9 | 10 | 11 | 12 |
| Amount of water coated (g/m$^2$) | 9 | 9 | 9 | 9 |
| Parts of foamable particles (parts by mass) | 0.97 | 0.97 | 0.97 | 1.45 |
| Amount of pressure-sensitive adhesive coated (g/m$^2$) | 30 | 30 | 30 | 30 |
| Heating temperature of base material side of laminate (° C.) | 160 | 160 | 175 | 160 |
| Heating temperature of pressure-sensitive adhesive layer side of laminate (° C.) | 135 | 135 | 135 | 135 |
| Heating time (s) | 4 | 4 | 4 | 4 |
| Average cell diameter (D) (μm) | 45 | 46 | 60 | 57 |
| Expansion ratio (E) | 1.94 | 1.95 | 1.89 | 1.93 |
| Expansion ratio by first cells (E1) | 1.75 | 1.75 | 1.68 | 1.75 |
| Amount of expansion ratio increased by second cells (E2) | 0.19 | 0.20 | 0.21 | 0.18 |
| Thickness of pressure-sensitive adhesive layer (μm) | 31 | 31 | 30 | 31 |
| Surface roughness (Rz) (μm) | 17 | 20 | 43 | 42 |
| Ball tack value | 11 | 11 | 13 | 5 |
| (long-term stability) | A | A | B | B |
| Packing performance (long-term stability) (peeling rate %) | 23 AA | 26 AA | 65 C | 90 C |

In the pressure-sensitive adhesive layer of each Example, first cells contacting with the surface of the base material and second cells disposed at positions away from the surface of the base material were concurrently present; thereby, although the expansion ratio was made high and the amount of the pressure-sensitive adhesive was made small, the ball tack value and the packing performance became good and a high pressure-sensitive adhesive performance could be retained.

By contrast, in Comparative Examples 1 and 2, since cells were formed by either water foaming or particle foaming, when the expansion ratio was made high and the amount of the pressure-sensitive adhesive was made small, the ball tack value and the packing performance were lowered and a high pressure-sensitive adhesive performance could not be retained.

Further comparing Examples 9 and 10 with Examples 11 and 12, it has been shown that the long-term stability of the high pressure-sensitive adhesive performance is further improved by making the surface roughness (Rz) of the outer surface of the pressure-sensitive adhesive layer to be 40 μm or smaller.

REFERENCE SIGNS LIST

10 PRESSURE-SENSITIVE ADHESIVE TAPE
11 BASE MATERIAL
12 PAPER BASE MATERIAL
13 RESIN LAYER
20 PRESSURE-SENSITIVE ADHESIVE LAYER
21 CELL
21A FIRST CELL
21B SECOND CELL
30 RELEASE AGENT LAYER

The invention claimed is:

1. A pressure-sensitive adhesive tape, comprising: a base material;
and a pressure-sensitive adhesive layer provided on the surface of the base material and comprising cells in the inside thereof,
the cells comprising first cells contacting with the surface of the base material and second cells disposed at positions away from the surface of the base material,
the first cells being cells derived from a liquid volatile component,
the second cells being cells derived from foamable particles, wherein the foamable particles comprise a hollow particle having a cell inside of an outer shell of the hollow particle,
a surface roughness (Rz) of the outer surface of the pressure-sensitive adhesive layer being 40 μm or smaller, and
the average cell diameter of the first cells being larger than the average cell diameter of the second cells,
wherein the base material comprises a paper base material and a resin layer provided on one surface of the paper base material, and the pressure-sensitive adhesive layer is provided on the other surface of the paper base material,
the paper base material is kraft paper and the resin layer is a polyethylene-based resin layer,
the pressure-sensitive adhesive layer further comprises a rubber component,
a content of the foamable particles in the pressure-sensitive adhesive layer is from 0.28 to 0.97 parts by mass with respect to 100 parts by mass of the rubber component, and
the pressure-sensitive adhesive layer has a peeling rate of 25% or lower.

2. The pressure-sensitive adhesive tape according to claim 1, wherein an expansion ratio of the pressure-sensitive adhesive layer as measured by a compression test is 1.8 times or more.

3. The pressure-sensitive adhesive tape according to claim 1, wherein an average cell diameter of the cells contained in the pressure-sensitive adhesive layer is 70 μm or smaller.

4. The pressure-sensitive adhesive tape according to claim 1, wherein the pressure-sensitive adhesive layer comprises: a foamed pressure-sensitive adhesive layer comprising cells in the inside thereof; and a non-foamed pressure-sensitive adhesive layer comprising no cells in the inside thereof on the opposite side of the foamed pressure-sensitive adhesive layer to the base material side.

5. A method for producing a pressure-sensitive adhesive tape, comprising:
coating or impregnating the surface of a base material with a liquid volatile component;
laminating a pressure-sensitive adhesive composition comprising foamable particles on the surface of the base material to obtain a laminate; and
heating the laminate to thereby form cells in the inside of a pressure-sensitive adhesive layer constituted of the pressure-sensitive adhesive composition, and
wherein the pressure-sensitive adhesive tape comprises:
the base material; and the pressure-sensitive adhesive layer provided on the surface of the base material and comprising cells in the inside thereof,
the cells comprising first cells contacting with the surface of the base material and second cells disposed at positions away from the surface of the base material,
the first cells being cells derived from a liquid volatile component,
the second cells being cells derived from foamable particles, wherein the foamable particles comprise a hollow particle having a cell inside of an outer shell of the hollow particle, a surface roughness (Rz) of the outer surface of the pressure-sensitive adhesive layer being 40 μm or smaller, and the average cell diameter of the first cells being larger than the average cell diameter of the second cells, wherein the base material comprises a paper base material and a resin layer provided on one surface of the paper base material, and the pressure-sensitive adhesive layer is provided on the other surface of the paper base material, the paper base material is kraft paper and the resin layer is a polyethylene-based resin layer, the pressure-sensitive adhesive layer further comprises a rubber component, a content of the foamable particles in the pressure-sensitive adhesive layer is from 0.28 to 0.97 parts by mass with respect to 100 parts by mass of the rubber component, and the pressure-sensitive adhesive layer has a peeling rate of 25% or lower.

6. The method for producing a pressure-sensitive adhesive tape according to claim 5, wherein when the laminate is heated, the laminate is heated so that a temperature of the surface of the laminate on the pressure-sensitive adhesive composition side is made to be lower than a temperature of the surface of the laminate on the base material side, to cause at least the foamable particles on the base material side of the pressure-sensitive adhesive composition to be foamed.

* * * * *